(12) United States Patent
Takada et al.

(10) Patent No.: US 8,595,776 B2
(45) Date of Patent: Nov. 26, 2013

(54) TRAIN-MOUNTED CONTENT DELIVERY SYSTEM AND METHOD OF DISPLAYING TRAIN CONTENT INFORMATION

(75) Inventors: Masahiro Takada, Chiyoda-ku (JP); Tadashi Yamamura, Chiyoda-ku (JP); Takaji Sano, Kobe (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 13/319,394

(22) PCT Filed: Jun. 4, 2010

(86) PCT No.: PCT/JP2010/059551
§ 371 (c)(1),
(2), (4) Date: Nov. 8, 2011

(87) PCT Pub. No.: WO2011/004666
PCT Pub. Date: Jan. 13, 2011

(65) Prior Publication Data
US 2012/0066713 A1 Mar. 15, 2012

(30) Foreign Application Priority Data
Jul. 6, 2009 (JP) .................................. 2009-160122

(51) Int. Cl.
*H04N 7/18* (2006.01)
(52) U.S. Cl.
USPC .................. 725/75; 725/32; 725/74; 715/730
(58) Field of Classification Search
USPC ....................................................... 725/74, 75
See application file for complete search history.

(56) References Cited

U.S. PATENT DOCUMENTS 8,214,864 B2 7/2012 Emoto et al.
8,291,456 B2 10/2012 Emoto et al.
(Continued)

FOREIGN PATENT DOCUMENTS

EP 1 845 725 A1 10/2007
EP 1 903 800 A1 3/2008
(Continued)

OTHER PUBLICATIONS

International Search Report (PCT/ISA/210) issued on Sep. 7, 2010, by Japanese Patent Office as the International Searching Authority for International Application No. PCT/JP2010/059551.
(Continued)

*Primary Examiner* — Robert Hance
(74) *Attorney, Agent, or Firm* — Buchanan Ingersoll & Rooney PC

(57) ABSTRACT

A train-mounted content delivery system includes a video information delivery apparatus that performs delivery control for advertisement/guidance image content and a display control apparatus that stores service image content generated based on train information from a train information apparatus, accumulates advertisement/guidance image content delivered from the video information delivery apparatus, and controls, based on a display schedule created by the video information delivery apparatus, display of a service image and an advertisement/guidance image that should be displayed on displays. The video information delivery apparatus includes a service image scheduler that manages the service image content and an advertisement/guidance image scheduler that manages the advertisement/guidance image content. Switching from the service image to the advertisement/guidance image or switching from the advertisement/guidance image to the service image in the displays is executed according to the control by the service image scheduler.

32 Claims, 7 Drawing Sheets

(56) References Cited

U.S. PATENT DOCUMENTS

| | | |
|---|---|---|
| 2005/0093854 A1* | 5/2005 | Kennedy et al. .............. 345/213 |
| 2007/0182835 A1* | 8/2007 | Emoto et al. ................. 348/265 |
| 2008/0001945 A1* | 1/2008 | Kashito et al. ................ 345/418 |
| 2008/0295138 A1* | 11/2008 | Emoto et al. .................... 725/81 |

FOREIGN PATENT DOCUMENTS

| | | |
|---|---|---|
| JP | 2003-099670 A | 4/2003 |
| JP | 2004-070254 A | 3/2004 |
| JP | 2005-057524 A | 3/2005 |
| JP | 2006-293595 A | 10/2006 |
| JP | 2009-107359 A | 5/2009 |

OTHER PUBLICATIONS

Written Opinion (PCT/ISA/237) issued on Sep. 7, 2010, by Japanese Patent Office as the International Searching Authority for International Application No. PCT/JP2010/059551.

Extended Search Report from European Patent Office dated Apr. 25, 2013, issued in corresponding European Patent Application No. 10796977.6. (9 pages).

Office Action from Australian Patent Office (IP Australia) dated Aug. 12, 22013, issued in corresponding Australian Patent Application No. 2010269639. (3 pages).

* cited by examiner

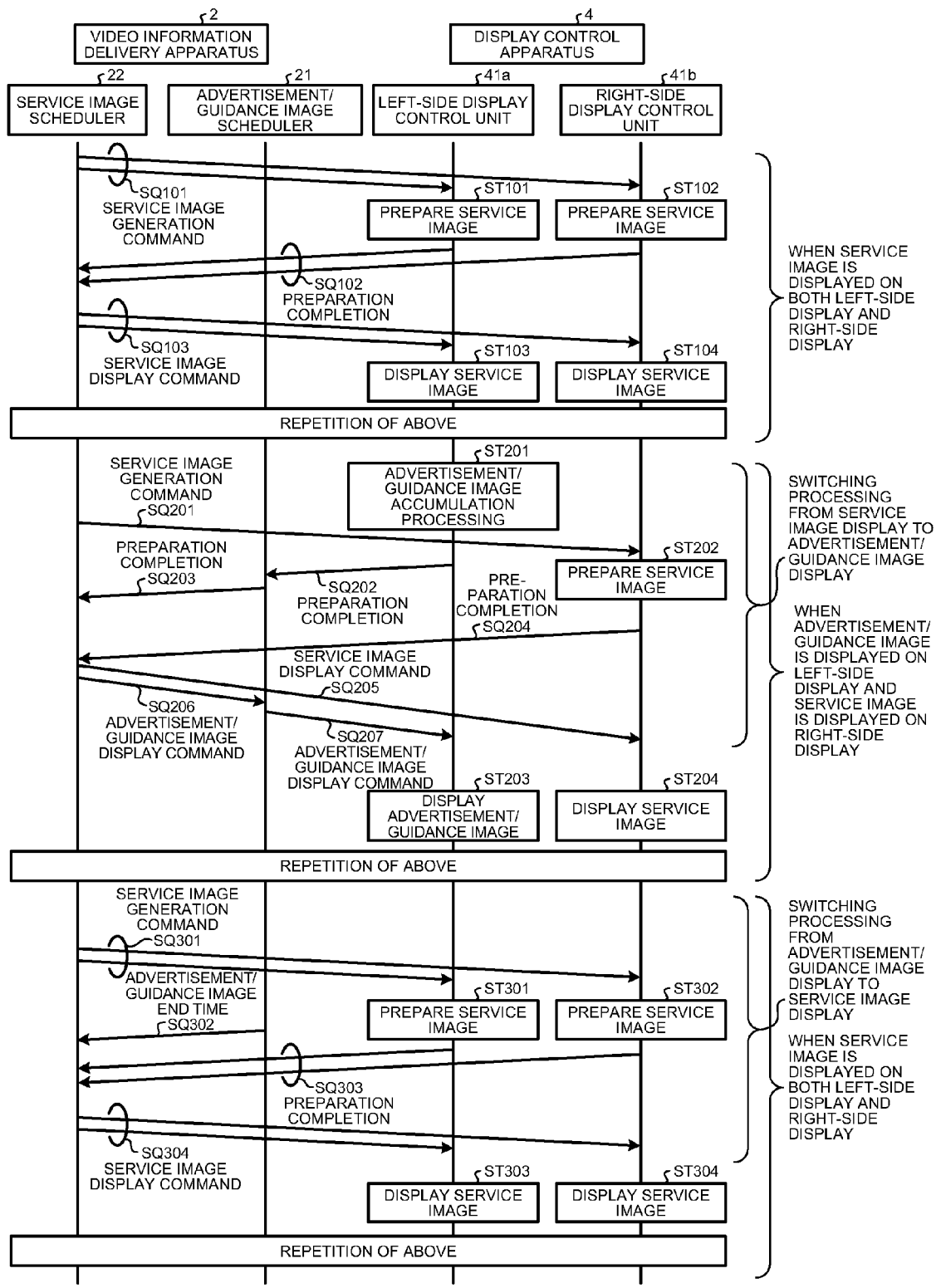

TRAIN-MOUNTED CONTENT DELIVERY SYSTEM AND METHOD OF DISPLAYING TRAIN CONTENT INFORMATION

FIELD

The present invention relates to a train-mounted content delivery system that displays, on a display in a train, train content information including content information representing, as still images, information concerning services of the train such as next station guidance and transfer guidance (hereinafter referred to as "service image content") and content information representing, as moving images or still images, advertisement information for advertizing a product and the like and guidance information such as news, weather forecast, and stock information (hereinafter referred to as "advertisement/guidance image content") and a method of displaying the train content information.

BACKGROUND

In trains in service in recent years, for the purpose of a more comfortable service and a more efficient and safe service, a digital transmission line is used for communication between car-mounted apparatuses of cars such as doors, air conditioners, brakes, motors, ATOs, SIVs, and automatic broadcast apparatuses and a train control apparatus for collecting, monitoring, and controlling train information. However, because a larger-capacity digital transmission line can be applied according to the network technology in recent years, delivery of video information and the like is also possible.

For the delivery of the video information and the like, there are an application in which a driver and a crew member collect and monitor video information from a fixed camera provided in a station platform and an application of passenger service such as delivery of information beneficial to passengers, for example, information concerning a train service such as destination guidance, next station guidance, stop guidance, and service information (arrival time change guidance), news, weather forecast, advertisements, and regional information (peculiar information around a stop).

In the system in the past of this type, when service image content is displayed, several seconds are necessary to read compressed content data and, at the same time, decompress the read data and expand the data in a memory, and display the data. Therefore, there is a problem in that there is a no-display period (hereinafter referred to as "blank") clearly noticed by human eyes at display switching time from a service image to a service image.

On the other hand, in a system disclosed in Patent Literature 1, a service image is expanded and prepared in advance before display and content switching of a display command is timed, whereby switching from a currently-displayed service image to the prepared service image is seamlessly performed.

CITATION LIST

Patent Literature
Patent Literature 1: Japanese Patent Application Laid-Open No. 2005-57524

SUMMARY

Technical Problem

However, in the system in the past disclosed in Patent Literature 1, although the blank that occurs during the switching of the service image display is taken into account, a blank that occurs during display switching from an advertisement/guidance image to a service image is not taken into account at all.

The present invention has been devised in view of the above and it is an object of the present invention to provide a train-mounted content delivery system and a method of displaying train content information that enable seamless display switching from an advertisement/guidance image to a service image and from the service image to the advertisement/guidance image.

Solution to Problem

In order to solve the above problem and in order to attain the above object, in a train-mounted content delivery system that displays, on a display in a train, train content information including advertisement/guidance image content and service image content generated based on train information, the train-mounted content delivery system of the present invention includes: a video information delivery apparatus that performs management of a display schedule of the train content information, stores the advertisement/guidance image content, and performs delivery control for the advertisement/guidance image content; and a display control apparatus that stores the service image content, temporarily accumulates the advertisement/guidance information content, which should be displayed, delivered from the video information delivery apparatus, and controls, based on the display schedule created by the video information delivery apparatus, display of a service image and an advertisement/guidance image that should be displayed on the display. The video information delivery apparatus includes: a service image scheduler that manages the service image content included in the display schedule; and an advertisement/guidance image scheduler that manages the advertisement/guidance image content included in the display schedule, and switching from the service image to the advertisement/guidance image in the display is executed according to control by the service image scheduler that receives notification of display preparation completion of the advertisement/guidance image from the advertisement/guidance image scheduler.

Advantageous Effects of Invention

According to the present invention, there is an effect that it is possible to provide a train-mounted content delivery system that enables seamless display switching from an advertisement/guidance image to a service image and from the service image to the advertisement/guidance image.

BRIEF DESCRIPTION OF DRAWINGS

FIG. 7 is a sequence chart for explaining display control in the second embodiment.

DESCRIPTION OF EMBODIMENTS

Train-mounted content delivery systems according to embodiments of the present invention are explained in detail with reference to the accompanying drawings. The present invention is not limited by details explained below.

First Embodiment

Figure 1:
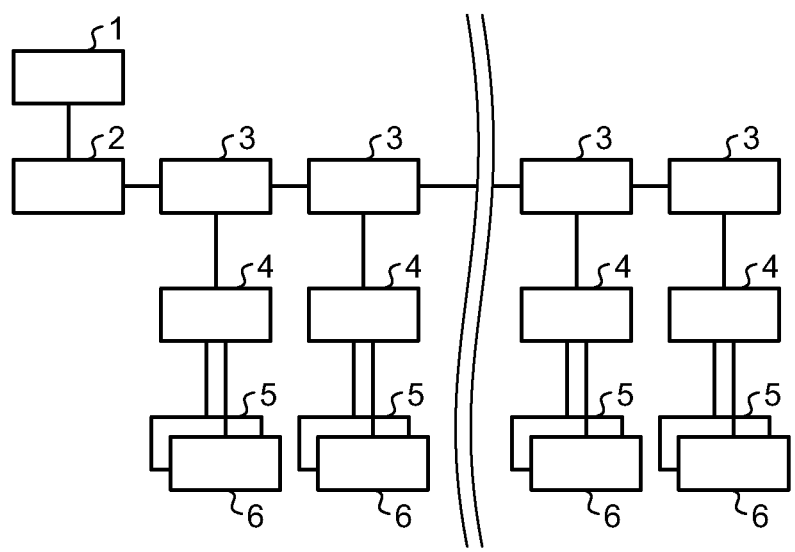
FIG. 1 is a diagram of the configuration of a train-mounted content delivery system according to a first embodiment of the present invention.
Figure 2:
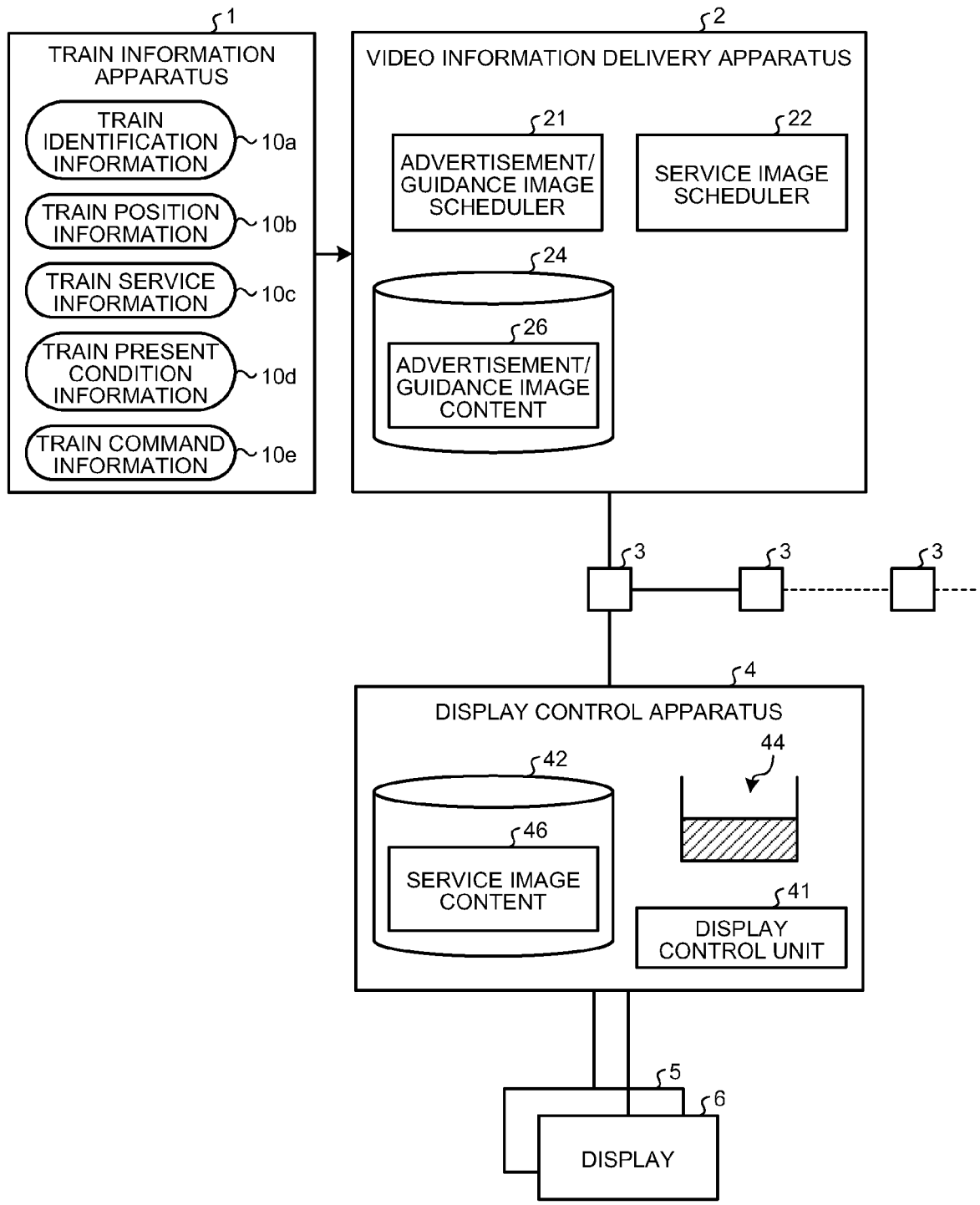
FIG. 2 is a diagram of detailed configurations of a train information apparatus, a video information delivery apparatus, and a display control apparatus that embody functions of the train-mounted delivery system according to the first embodiment.

FIG. 1 is a diagram of the configuration of a train-mounted content delivery system according to a first embodiment of the present invention. The train-mounted content delivery system according to the first embodiment includes, as shown in FIG. 1, a train information apparatus 1, a video information delivery apparatus 2, diverting apparatuses 3, display control apparatuses 4, and displays 5 and 6. In this train-mounted content delivery system, it is possible to appropriately switch and display service images including the same content and advertisement/guidance images including the same content on the displays 5 and 6. It is also possible to seamlessly perform switching from an advertisement/guidance image to a service image and switching from the service image to the advertisement/guidance image. These functions are realized by functions of a service image scheduler and an advertisement/guidance image scheduler (details are explained later) provided in the video information delivery apparatus 2. In FIG. 1, two displays connected to the display control apparatus 4 are shown as an example. However, one display or three or more displays can be connected. By adding the diverting apparatuses 3 connected in a row, it is also possible to increase a total number of displays mounted on a train without increasing the number of displays connected to the display control apparatus 4. FIG. 2 is a diagram of detailed configurations of the train information apparatus 1, the video information delivery apparatus 2, and the display control apparatus 4 that embody the functions of the train-mounted content delivery system according to the first embodiment. In FIG. 2, the video information delivery apparatus 2 includes an advertisement/guidance image scheduler 21, a service image scheduler 22, and a storing unit (a first storing unit) 24. The display control apparatus 4 includes a display control unit 41, a storing unit (a second storing unit) 42, and an advertisement/guidance image storing buffer 44. Advertisement/guidance image content 26, which is one of kinds of train content information, is stored in the storing unit 24 of the video information delivery apparatus 2. Service image content 46, which is one of kinds of train content information, is stored in the storing unit 42 of the display control apparatus 4. Functions of the advertisement/guidance image scheduler 21 and the service image scheduler 22 included in the video information delivery apparatus 2 and the display control unit 41 included in the display control apparatus 4 among these components are explained later. The advertisement/guidance image storing buffer 44 is a buffer for synchronizing display switching from a service image to an advertisement/guidance image and is different from a buffer (not shown) for temporarily accumulating the advertisement/guidance image content 26 from the video information delivery apparatus 2. When an advertisement/guidance image display command from the advertisement/guidance image scheduler 21 is output by this advertisement/guidance image storing buffer 44, an advertisement/guidance image to be displayed is quickly output to the displays 5 and 6.

On the other hand, the train information apparatus 1 stores, as train information necessary for generation of, in particular, the service image content 46 among the kinds of train content information, train identification information 10a including a train number for identifying a train, train position information 10b including kilometrage from the starting station and a traveling area of the train, train service information 10c including stop information and estimated arrival time, train present condition information 10d including arrival time and the number of passengers, and train command information 10e including a door opening and closing command and a stop command. These kinds of train information are information necessary for generation of service image information in the train-mounted content delivery system according to this embodiment such as, in particular, destination guidance, next station guidance, and stop guidance and is notified from the train information apparatus 1 to the video information delivery apparatus 2 and the display control apparatus 4 as appropriate.

Figure 3:
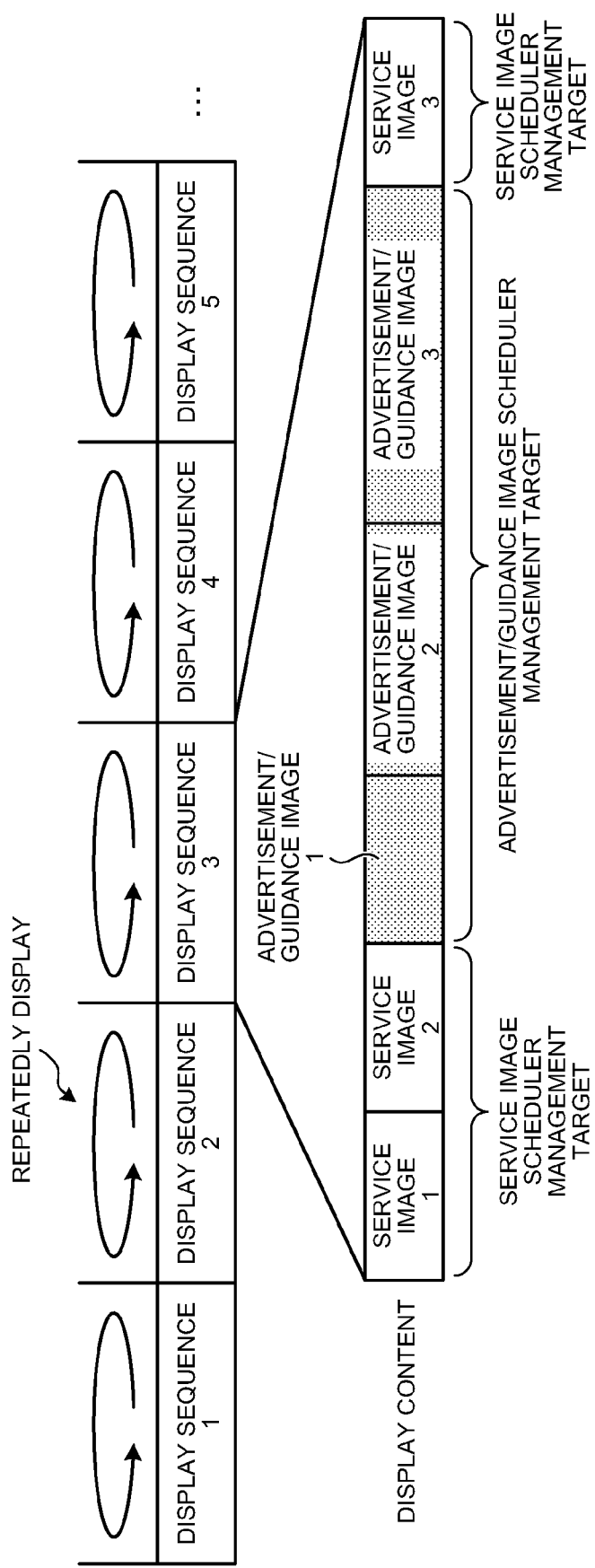
FIG. 3 is a diagram for explaining the concept of display sequences and display contents in the first embodiment.

FIG. 3 is a diagram for explaining the concept of display sequences and display contents according to the first embodiment. In the upper part of FIG. 3, display sequences 1 to 5 are shown as an example of display schedule data. In the lower part of FIG. 3, display contents repeatedly displayed in the display sequence 3 are shown as an example. The display sequence 3 includes service images 1 to 3, which are management targets of the service image scheduler 22, and advertisement/guidance images 1 to 3, which are management targets of the advertisement/guidance image scheduler 21. In the example shown in the figure, display sequences in the order of "service image 1", "service image 2", "advertisement/guidance image 1", "advertisement/guidance image 2", "advertisement/guidance image 3", and "service image 3" are set.

In the display schedule data shown in FIG. 3, contents to be displayed, display times, and the like are described. The video information delivery apparatus 2 determines, based on train information (kilometrage information and train traveling speed information) from the train information apparatus 1, a shift among the display sequences. If the video information delivery apparatus does not determine a shift to the next sequence, a schedule in a display sequence is repeatedly displayed.

Figure 4:
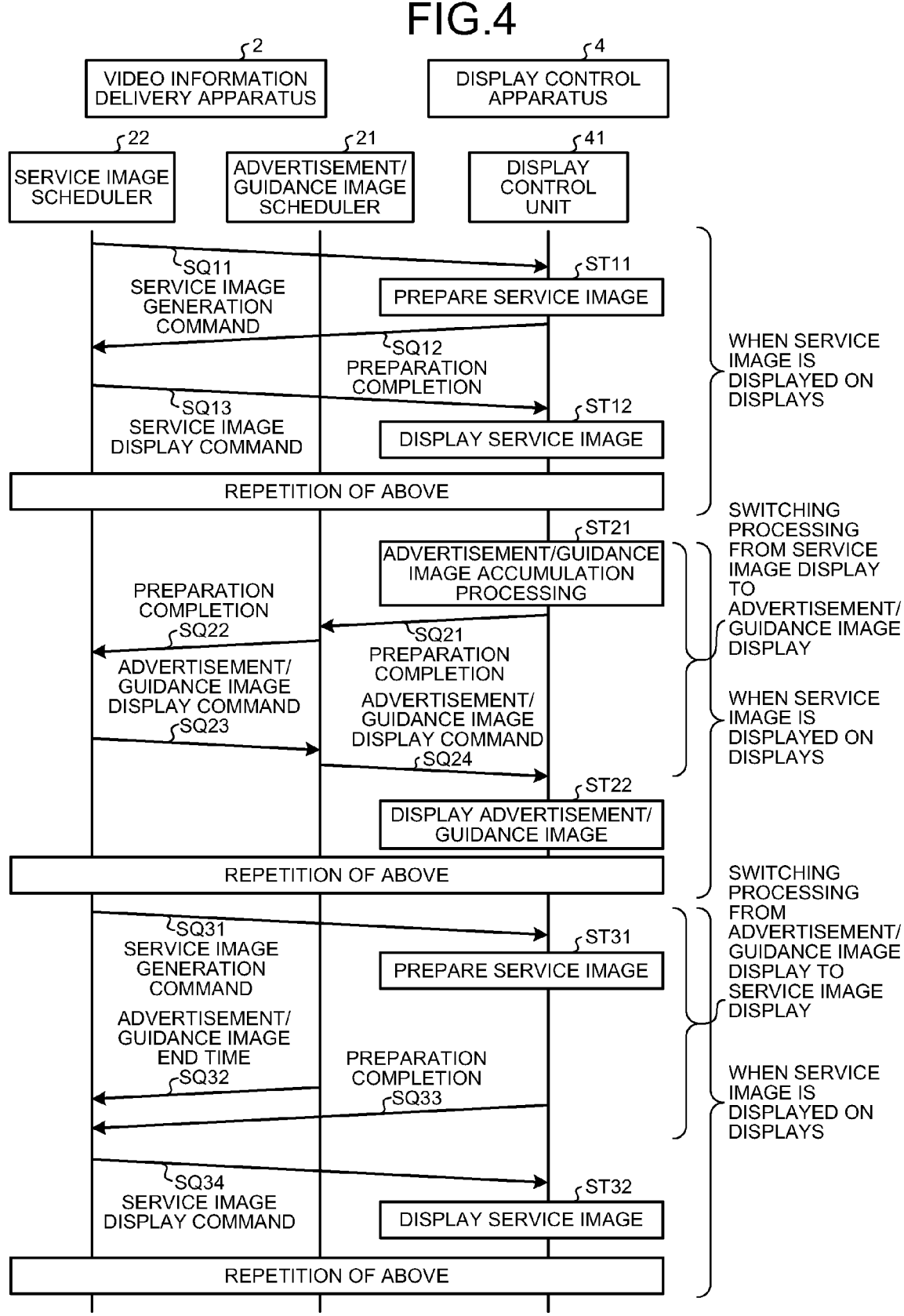
FIG. 4 is a sequence chart for explaining display control in the first embodiment.

Display control in the first embodiment is explained with reference to FIG. 4. FIG. 4 is a sequence chart for explaining the display control in the first embodiment. The service image scheduler 22 manages overall display control in the train-mounted content delivery system. The advertisement/guidance image scheduler 21 operates according to an instruction of the service image scheduler 22. However, the advertisement/guidance image scheduler 21 performs management of advertisement/guidance image contents included in the display sequences and issuance of a display command concerning the advertisement/guidance image contents. The display control unit 41 performs display control for the displays 5 and 6.

In FIG. 4, the service image scheduler 22 outputs a service image generation command to the display control unit 41 of the display control apparatus 4 (sequence SQ11). The display control unit 41, which receives the service image generation command, performs preparation of a service image (step ST11). Because the service image is usually stored in a compressed format, the service image cannot be instantaneously displayed in that state. Therefore, in the processing at step ST11, processing for decompressing the compressed service image is executed. When the preparation for the service image is completed, the display control unit 41 notifies the service image scheduler 22 of the completion of the preparation (sequence SQ12). The service image scheduler 22, which receives the notification of the completion of the preparation, outputs a service image display command to the display control unit 41 (sequence SQ13). The display control unit 41, which receives the service image display command, displays the decompressed service image on the displays (step ST12). In this way, the processing at sequences SQ11 to SQ13 and the processing at steps ST11 and ST12 are processing for displaying the service image on the displays. It goes without saying that the service image generation command is issued when a service image that should be displayed before a service image to be processed is displayed.

Switching processing from service image display to advertisement/guidance image display is explained. As shown in the middle part of FIG. 4, first, advertisement/guidance image accumulation processing is performed (step ST21). In this advertisement/guidance image accumulation processing, advertisement/guidance image content to be displayed is accumulated in the advertisement/guidance image storing buffer 44. When the accumulation of the advertisement/guidance image content is completed, the display control unit 41 notifies the advertisement/guidance image scheduler 21 of the completion of the preparation (sequence SQ21). The advertisement/guidance image scheduler 21 notifies the service image scheduler 22 of the completion of the preparation (sequence SQ22). In the advertisement/guidance image accumulation processing at step ST21, all advertisement/guidance image contents that should be displayed do not need to be accumulated. This is because the advertisement/guidance image storing buffer 44 is truly a buffer provided to seamlessly perform switching from the advertisement/guidance image display to the service image display and switching from the service image display to the advertisement/guidance image display and a buffer that temporarily accumulates advertisement/guidance image content from the video information delivery apparatus 2 is separately present.

The service image scheduler 22 grasps switching timing from the service image display to the advertisement/guidance image display. The service image scheduler 22 issues an advertisement/guidance image display command to the advertisement/guidance image scheduler 21 at predetermined timing taking into account time until the a command reaches the display control unit 41 from the service image scheduler 22 through the advertisement/guidance image scheduler 21 (sequence SQ23). The advertisement/guidance image scheduler 21, which receives the advertisement/guidance image display command from the service image scheduler 22, issues an advertisement/guidance image display command to the display control unit 41 (sequence SQ24). The display control unit 41, which receives the advertisement/guidance image display command, starts advertisement/guidance image display (step ST22). In this way, switching processing from the service image display to the advertisement/guidance image display is seamlessly performed.

Switching processing from the advertisement/guidance image display to the service image display is explained. As shown in the lower part of FIG. 4, first, a service image generation command is issued from the service image scheduler 22 to the display control unit 41 (sequence SQ31). The display control unit 41 performs, for example, processing for decompressing a compressed service image and performs preparation for a service image that should be displayed (step ST31). When the preparation of the service image is completed, the display control unit 41 notifies the service image scheduler 22 of the completion of the preparation (sequence SQ33). On the other hand, the advertisement/guidance image scheduler 21 notifies, in advance, the service image scheduler 22 of end time of a currently-displayed advertisement/guidance image (sequence SQ32). The service image scheduler 22 grasps switching timing from the advertisement/guidance image display to the service image display and issues a service image display command to the display control unit 41 at predetermined timing taking into account time until a command reaches the display control unit 41 from the service image scheduler 22 (sequence SQ34). The display control unit 41, which receives the service image display command, starts the service image display (step ST32). In this way, the switching processing from the advertisement/guidance image display to the service image display is seamlessly performed.

It is likely that display time for the next sequence decreases because of the control explained above. In this case, if a service image incorporated at the end of a display sequence of a display schedule (in the example shown in FIG. 3, "service image 3") is set as, for example, information with low importance (e.g., information that does not cause dissatisfaction even if not present such as information in the station yard), information provision that does not give discomfort to a viewer can be performed.

As explained above, the train-mounted content delivery system according to the first embodiment includes the service image scheduler that manages service image contents included in a display schedule and the advertisement/guidance image scheduler that manages advertisement/guidance image contents included in the display schedule. Switching from a service image to an advertisement/guidance image in the displays is executed according to the control by the service image scheduler that receives notification of display preparation completion of the advertisement/guidance image from the advertisement/guidance image scheduler. Switching from the advertisement/guidance image to the service image is executed according to the control by the service image scheduler that receives notification of preparation completion of the service image from the display control unit and receives notification of display end time of a currently-displayed advertisement/guidance image from the advertisement/guidance image scheduler. Therefore, it is possible to perform seamless switching from the advertisement/guidance image to the service image and from the service image to the advertisement/guidance image.

In the first embodiment, the configuration in which the storing unit 42 that stores the service image content 46 and the advertisement/guidance image storing buffer 44 are provided in the display control apparatus 4 is explained. However, it is also possible to adopt a configuration in which the storing unit 42 and the advertisement/guidance image storing buffer 44 are provided in the video information delivery apparatus 2. In this case, the sequence shown in FIG. 4 is a sequence executed on the inside of the video information delivery apparatus 2. The display control unit 41 of the display control apparatus 4 only has to perform control for outputting information concerning an advertisement/guidance image and a service image, which is transmitted to the display control unit 41, to the displays 5 and 6.

Second Embodiment

In the train-mounted content delivery system according to the first embodiment, the embodiment in which the same content is displayed on the two displays is explained. However, in a train-mounted content delivery system according to a second embodiment, an embodiment in which different contents are displayed on two displays is explained. The two displays are, for example, displays set side by side in a lintel section at an upper part of each car. The different contents mean that, for example, in some case, both contents displayed on the first and second displays are service images or advertisement/guidance images and, in another case, content displayed on the first display is a service image and content displayed on the second display is a service image and an advertisement/guidance image.

Figure 5:
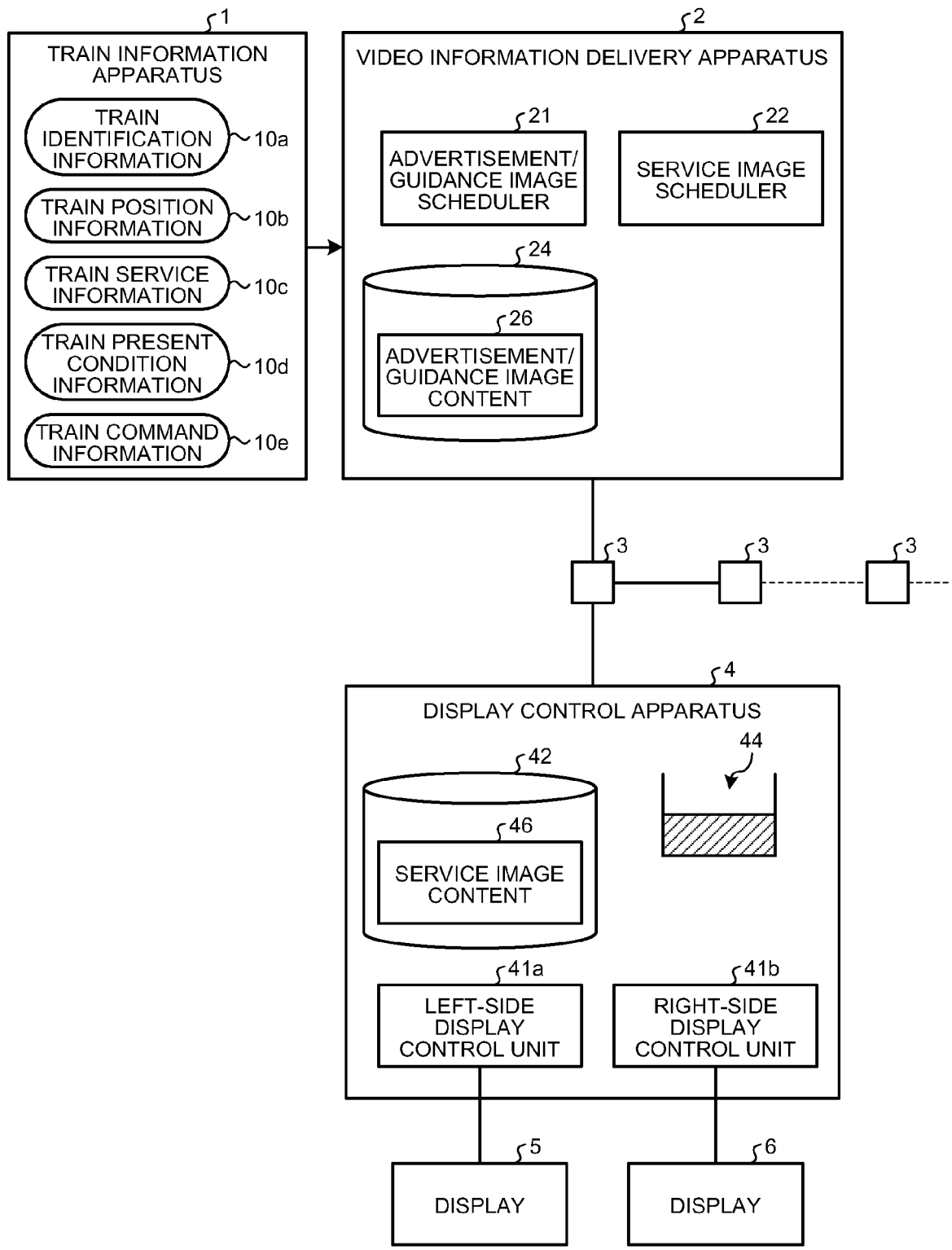
FIG. 5 is a diagram of detailed configurations of a train information apparatus, a video information delivery appara

FIG. 5 is a diagram of detailed configurations of the train information apparatus 1, the video information delivery apparatus 2, and the display control apparatus 4 that embody functions of the train-mounted content delivery system according to the second embodiment. The second embodiment is different from the first embodiment shown in FIG. 2 only in that a left-side display control unit (a first display control unit) 41a and a right-side display control unit (a second display control unit) 41b for respectively controlling the display (the first display) 5, which is a left-side display, and the display 6, which is a right-side display, are provided in the display control apparatus 4. Other components are denoted by reference numerals and signs same as those in FIG. 2 and redundant explanation of the components is omitted.

Figure 6:
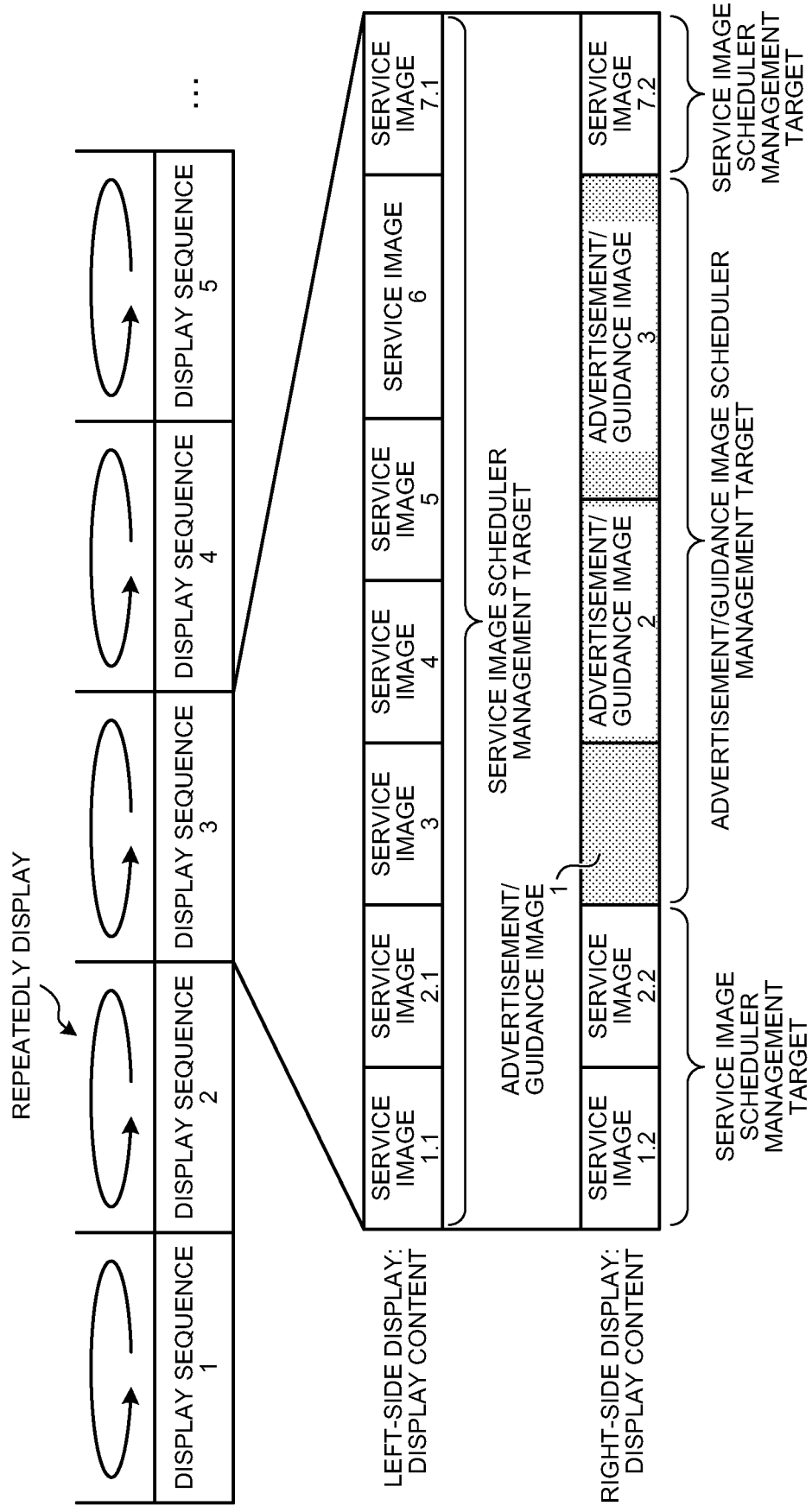
- FIG. 6 is a diagram for explaining the concept of display sequences and display contents in the second embodiment.

FIG. 6 is a diagram for explaining the concept of display sequences and display contents according to the second embodiment. In the upper part of FIG. 6, display sequences 1 to 5 are shown as an example of display schedule data. In the middle part and the lower part of FIG. 6, display contents repeatedly displayed in the display sequence 3 are shown as an example. The display sequence 3 includes display contents displayed on the left-side display (the display 5) and display contents displayed on the right-side display (the display 6).

The display contents displayed on the left-side display include service images 1.1, 1.2, 3 to 6, and 7.1, which are management targets of the service image scheduler 22. In the example shown in the figure, display sequences in the order of "service image 1.1", "service image 2.1", "service image 3", "service image 4", "service image 5", "service image 6", and "service image 7.1" are set. On the other hand, the display contents displayed on the right-side display include service images 1.2, 2.2, and 7.2, which are management targets of the service image scheduler 22, and advertisement/guidance images 1 to 3, which are management targets of the advertisement/guidance image scheduler 21. In the example shown in the figure, display sequences in the order of "service image 1.2", "service image 2.2", "advertisement/guidance image 1", "advertisement/guidance image 2", "advertisement/guidance image 3", and "service image 7.1" are set. "Service image 1.1" and "service image 1.2" are kinds of information related to each other. In some case, for example, "service image 1.1" is information concerning a stop and "service image 1.2" is door opening information (e.g., information indicating on which side doors are opened) and, in another case, for example, "service image 1.1" is information concerning next station guidance and "service image 1.2" is station yard information of the next station (e.g., information such as an elevator position and a stair position). In this embodiment, such kinds of information related to each other can be displayed on the left and right displays in synchronization with each other at the same timing.

In the display schedule data, content to be displayed, display time, and the like are described. The video information delivery apparatus 2 determines, based on train information (kilometrage information and train traveling speed information) from the train information apparatus 1, a shift among the display sequences. If the video information delivery apparatus does not determine a shift to the next sequence, a schedule in a display sequence is repeatedly displayed.

Display control in the second embodiment is explained with reference to FIG. 7. FIG. 7 is a sequence chart for explaining the display control in the second embodiment. The service image scheduler 22 manages overall display control in the train-mounted content delivery system. The advertisement/guidance image scheduler 21 operates according to an instruction of the service image scheduler 22. However, the advertisement/guidance image scheduler 21 performs management of advertisement/guidance image contents included in the display sequences and issuance of a display command concerning the advertisement/guidance image contents. The left-side display control unit 41a performs display control for the display 5. The right-side display control unit 41b performs display control for the display 6.

In FIG. 7, the service image scheduler 22 outputs a service image generation command to the left-side display control unit 41a and the right-side display control unit 41b of the display control apparatus 4 (sequence SQ101). The left-side display control unit 41a, which receives the service image generation command, performs preparation of a service image to be displayed on the left-side display (step ST101). The right-side display control unit 41b, which receives the service image generation command, performs preparation of a service image to be displayed on the right-side display (step ST102). Because the service images are usually stored in a compressed format, the service images cannot be instantaneously displayed in that state. Therefore, in the processing at steps ST101 and ST102, processing for decompressing the compressed service images is executed. When the preparations for the service images are completed, the left-side display control unit 41a and the right-side display control unit 41b notify the service image scheduler 22 of the completion of the preparations (sequence SQ102). The service image scheduler 22, which receives the notification of the completion of the preparations, outputs a service image display command to the left-side display control unit 41a and the right-side display control unit 41b (sequence SQ103). The left-side display control unit 41a and the right-side display control unit 41b, which receive the service image display command at the same time, display the decompressed service images on the displays thereof (steps ST103 and ST104). In this way, the processing at sequences SQ101 to SQ103 and the processing at steps ST101 and ST104 are processing for displaying the service images on the displays. It goes without saying that the service image generation command is issued when a service image that should be displayed before a service image to be processed is displayed.

Switching processing from service image display to advertisement/guidance image display is explained. In this sequence, the advertisement/guidance image display is performed on the left-side display.

As shown in the middle part of FIG. 7, first, advertisement/guidance image accumulation processing is performed in the left-side display control unit 41a (step ST201). In this advertisement/guidance image accumulation processing, advertisement/guidance image content to be displayed is accumulated in the advertisement/guidance image storing buffer 44. When the accumulation of the advertisement/guidance image content is completed, the left-side display control unit 41a notifies the advertisement/guidance image scheduler 21 of the completion of the preparation (sequence SQ202). The advertisement/guidance image scheduler 21 notifies the service image scheduler 22 of the completion of the preparation (sequence SQ203). In the advertisement/guidance image accumulation processing at step ST201, as in the first embodiment, all advertisement/guidance image contents that should be displayed do not need to be accumulated.

On the other hand, almost simultaneously with the advertisement/guidance image accumulation processing at step ST201 being performed, a service image generation command is output from the service image scheduler 22 to the right-side display device control unit 41b (sequence SQ201). The right-side display control unit 41b performs preparation of a service image (step ST202) and, when the preparation is completed, notifies the service image scheduler 22 of the completion of the preparation (sequence SQ204).

The service image scheduler 22 grasps switching timing from the service image display to the advertisement/guidance image display in the left-side display control unit 41a. The service image scheduler 22 issues a service image display command to the right-side display control unit 41b at predetermined timing taking into account time until the a command reaches the left-side display control unit 41a from the service image scheduler 22 through the advertisement/guidance image scheduler 21 and such that the advertisement/guidance image display and the service image display are switched in the left-side display and the right-side display in synchronization with each other (sequence SQ205). The service image scheduler 22 issues an advertisement/guidance image display command to the advertisement/guidance image scheduler 21 at predetermined timing (sequence SQ206). The advertisement/guidance image scheduler 21, which receives the advertisement/guidance image display command from the service image scheduler 22, issues an advertisement/guidance image display command to the left-side display control unit 41a (sequence SQ207). The left-side display control unit 41a, which receives the advertisement/guidance image display command, starts advertisement/guidance image display (step ST203). The right-side display control unit 41b, which receives the service image display command at the same time, starts the service image display (step ST204). In this way, switching processing from the service image display to the advertisement/guidance image display and the synchronization processing of the service image display and the advertisement/guidance image display are seamlessly performed.

Switching processing from the advertisement/guidance image display to the service image display is explained. As shown in the lower part of FIG. 7, first, a service image generation command is issued from the service image scheduler 22 to the left-side display control unit 41 a and the right-side display control unit 41 b (sequence SQ301). The left-side display control unit 41 a and the right-side display control unit 41 b perform, for example, processing for decompressing a compressed service image and perform preparation for a service image that should be displayed (steps ST301 and ST302). When the preparation of the service image is completed, the left-side display control unit 41 a and the right-side display control unit 41 b notify the service image scheduler 22 of the completion of the preparation (sequence SQ303). On the other hand, the advertisement/guidance image scheduler 21 notifies, in advance, the service image scheduler 22 of end time of a currently-displayed advertisement/guidance image (sequence SQ302). The service image scheduler 22 grasps switching timing from the advertisement/guidance image display to the service image display and also grasps that the advertisement/guidance image is displayed on the left-side display and the service image is displayed on the right-side display at present. The service image scheduler 22 issues a service image display command to the left-side display control unit 41 a and the right-side display control unit 41 b at predetermined timing taking into account, for example, time until a command reaches the left-side display control unit 41 a and the right-side display control unit 41 b from the service image scheduler 22 and time when the advertisement/guidance image display ends (sequence SQ304). The left-side display control unit 41 a and the right-side display control unit 41 b, which receive the service image display command at the same time, start the service image display (steps ST303 and ST304). In this way, the switching processing from the advertisement/guidance image display to the service image display and the synchronization processing of the service image display and the advertisement/guidance image display are seamlessly performed.

When the control explained above is performed, in display control by a normal display schedule, it is difficult to match end time of the service image display and end time of the advertisement/guidance image display. Therefore, it is desirable to adjust the end of the display of the service image displayed on the right-side display to the end of the display of the advertisement/guidance image simultaneously displayed on the left-side display and, in some case, for example, repeatedly display the service image and the advertisement/guidance image to display a service image without a sense of discomfort for a viewer.

It is likely that display time for the next sequence decreases because of the control explained above. In this case, if a service image incorporated at the end of a display sequence of a display schedule (in the example shown in FIG. 6, "service image 7.1") is set as, for example, information with low importance (e.g., information that does not cause dissatisfaction even if not present such as information in the station yard), information provision that does not give discomfort to a viewer can be performed.

As explained above, the train-mounted content delivery system according to the second embodiment includes the service image scheduler that manages service image contents included a display schedule and the advertisement/guidance image scheduler that manages advertisement/guidance image contents included in the display schedule. In the first display that displays both a service image and an advertisement/guidance image, switching from the service image to the advertisement/guidance image is executed according to the control by the service image scheduler that receives notification of display preparation completion of the advertisement/guidance image from the advertisement/guidance image scheduler. In the first display, switching from the advertisement/guidance image to the service image is executed according to the control by the service image scheduler that receives notification of preparation completion of the service image from the second display control unit and receives notification of display end time of a currently-displayed advertisement/guidance image from the advertisement/guidance image scheduler. Therefore, it is possible to perform seamless switching from the advertisement/guidance image to the service image and from the service image to the advertisement/guidance image.

In the first embodiment, the configuration in which the storing unit 42 that stores the service image content 46 and the advertisement/guidance image storing buffer 44 are provided in the display control apparatus 4 is explained. However, it is also possible to adopt a configuration in which the storing unit 42 and the advertisement/guidance image storing buffer 44 are provided in the video information delivery apparatus 2. In this case, the sequence shown in FIG. 7 is a sequence executed on the inside of the video information delivery apparatus 2. The left-side display control unit 41a of the display control apparatus 4 only has to perform control for outputting information concerning an advertisement/guidance image and a service image, which is transmitted to the display 5, to the display 5. The right-side display control unit 41b only has to perform control for outputting information concerning a service image, which is transmitted to the display 6, to the display 6. The displays are explained as the left and right two screens. However, it is also possible to perform display switching processing and synchronization processing of the displays equal to or more than two screens.

REFERENCE SIGNS LIST 1 train information apparatus
2 video information delivery apparatus
3 diverting apparatus
4 display control apparatus
5 display (first display)
6 display (second display)
10a train identification information
10b train position information
10c train service information
10d train present condition information
10e train command information
21 advertisement/guidance image scheduler
22 service image scheduler
24, 42 storing units
26 advertisement/guidance image content
41 display control unit
41a left-side display control unit (first display control unit)
41b right-side display control unit (second display control unit)
44 advertisement/guidance image storing buffer
46 service image content

The invention claimed is:

1. A train-mounted content delivery system that displays, on a display in a train, train content information including advertisement/guidance image content and service image content generated based on train information, the train-mounted content delivery system comprising:
a video information delivery apparatus that performs management of a display schedule of the train content information, stores the advertisement/guidance image content, and performs delivery control for the advertisement/guidance image content; and
a display control apparatus that stores the service image content, temporarily accumulates the advertisement/guidance information content, which should be displayed, delivered from the video information delivery apparatus, and controls, based on the display schedule created by the video information delivery apparatus, display of a service image and an advertisement/guidance image that should be displayed on the display, wherein
the video information delivery apparatus includes:
a service image scheduler that manages the service image content included in the display schedule; and
an advertisement/guidance image scheduler that manages the advertisement/guidance image content included in the display schedule, and
switching from the service image to the advertisement/guidance image in the display is executed according to control by the service image scheduler that receives notification of display preparation completion of the advertisement/guidance image from the advertisement/guidance image scheduler.

2. The train-mounted content delivery system according to claim 1, wherein the advertisement/guidance image content is accumulated in the display control apparatus in advance prior to the display of the advertisement/guidance image on the display.

3. The train-mounted content delivery system according to claim 1, wherein the display schedule includes a plurality of display sequences, and the video information delivery apparatus determines, based on the train information, a shift among the display sequences.

4. The train-mounted content delivery system according to claim 3, wherein, when the video information delivery apparatus does not determine a shift to a next display sequence, a currently-displayed display sequence is repeatedly displayed.

5. The train-mounted content delivery system according to claim 1, wherein, when currently-displayed content is an advertisement/guidance image and content scheduled to be displayed next is a service image, switching from the advertisement/guidance image to the service image is performed after an end of the advertisement/guide image.

6. The train-mounted content delivery system according to claim 5, wherein
when at least one advertisement/guidance image content and a plurality of service image contents are included as the train content information included in the display sequence,
a service image content having a relatively low priority is incorporated as service image content displayed after display of the advertisement/guidance image content among the service image contents.

7. A train-mounted content delivery system that displays, on a display in a train, train content information including advertisement/guidance image content and service image content generated based on train information, the train-mounted content delivery system comprising:
a video information delivery apparatus that performs management of a display schedule of the train content information, stores the advertisement/guidance image content, and performs delivery control for the advertisement/guidance image content; and
a display control apparatus that stores the service image content generated based on the train information, temporarily accumulates the advertisement/guidance information content, which should be displayed, delivered from the video information delivery apparatus, and controls, based on the display schedule created by the video information delivery apparatus, display of a service image and an advertisement/guidance image that should be displayed on the display, wherein
the video information delivery apparatus includes:
a service image scheduler that manages the service image content included in the display schedule; and
an advertisement/guidance image scheduler that manages the advertisement/guidance image content included in the display schedule, and
switching from the advertisement/guidance image to the service image in the display is executed according to control by the service image scheduler that receives notification of display preparation completion of the service image from the display control apparatus and receives notification of display end time of a currently-displayed advertisement/guidance image from the advertisement/guidance image scheduler.

8. The train-mounted content delivery system according to claim 7, wherein the advertisement/guidance image content is accumulated in the display control apparatus in advance prior to the display of the advertisement/guidance image on the display.

9. The train-mounted content delivery system according to claim 7, wherein the display schedule includes a plurality of display sequences, and the video information delivery apparatus determines, based on the train information, a shift among the display sequences.

10. The train-mounted content delivery system according to claim 9, wherein, when the video information delivery apparatus does not determine a shift to a next display sequence, a currently-displayed display sequence is repeatedly displayed.

11. The train-mounted content delivery system according to claim 7, wherein, when currently-displayed content is an advertisement/guidance image and content scheduled to be displayed next is a service image, switching from the advertisement/guidance image to the service image is performed after an end of the advertisement/guide image.

12. The train-mounted content delivery system according to claim 11, wherein
when at least one advertisement/guidance image content and a plurality of service image contents are included as the train content information included in the display sequence,
a service image content having a relatively low priority is incorporated as service image content displayed after display of the advertisement/guidance image content among the service image contents.

13. A train-mounted content delivery system that displays, on first and second displays in a train, train content information including advertisement/guidance image content and service image content generated based on train information, the train-mounted content delivery system comprising:
a video information delivery apparatus that performs management of a display schedule of the train content information, stores the advertisement/guidance image content, and performs delivery control for the advertisement/guidance image content; and
a display control apparatus that stores the service image content generated based on the train information, temporarily accumulates the advertisement/guidance information content, which should be displayed, delivered from the video information delivery apparatus, and controls, based on the display schedule created by the video information delivery apparatus, display of an advertisement/guidance image and a service image that should be displayed on the first display and display of a service image that should be displayed on the second display, wherein
the video information delivery apparatus includes:
a service image scheduler that manages the service image content included in the display schedule; and
an advertisement/guidance image scheduler that manages the advertisement/guidance image content included in the display schedule, and
switching from the service image to the advertisement/guidance image in the first display is executed according to control by the service image scheduler that receives notification of display preparation completion of the advertisement/guidance image from the advertisement/guidance image scheduler.

14. The train-mounted content delivery system according to claim 13, wherein the advertisement/guidance image content is accumulated in the display control apparatus in advance prior to the display of the advertisement/guidance image on the first display.

15. The train-mounted content delivery system according to claim 13, wherein the display schedule includes a plurality of display sequences for each of the first and second displays, and the video information delivery apparatus determines, based on the train information, a shift among the display sequences.

16. The train-mounted content delivery system according to claim 15, wherein, when the video information delivery apparatus does not determine a shift to a next display sequence, a currently-displayed display sequence is repeatedly displayed.

17. The train-mounted content delivery system according to claim 13, wherein, in the first display, when currently-displayed content is an advertisement/guidance image and content scheduled to be displayed next is a service image, switching from the advertisement/guidance image to the service image is performed after an end of the advertisement/guide image.

18. The train-mounted content delivery system according to claim 17, when the display of the advertisement/guidance image displayed on the first display is extended and the switching from the advertisement/guidance image to the service image is performed after the end of the advertisement/guidance image, an end of the display of the service image displayed on the second display according to the display of the advertisement/guidance image is adjusted to the end of the display of the advertisement/guidance image.

19. The train-mounted content delivery system according to claim 17, wherein
when at least one advertisement/guidance image content and a plurality of service image contents are included as the train content information included in the display sequence for the first display,
a service image content having a relatively low priority is incorporated as service image content displayed after display of the advertisement/guidance image content among the service image contents.

20. A train-mounted content delivery system that displays, on first and second displays in a train, train content information including advertisement/guidance image content and service image content generated based on train information, the train-mounted content delivery system comprising:
a video information delivery apparatus that performs management of a display schedule of the train content information, stores the advertisement/guidance image content, and performs delivery control for the advertisement/guidance image content; and
a display control apparatus that stores the service image content generated based on the train information, temporarily accumulates the advertisement/guidance information content, which should be displayed, delivered from the video information delivery apparatus, and controls, based on the display schedule created by the video information delivery apparatus, display of an advertisement/guidance image and a service image that should be displayed on the first display and display of a service image that should be displayed on the second display, wherein
the video information delivery apparatus includes:
a service image scheduler that manages the service image content included in the display schedule; and
an advertisement/guidance image scheduler that manages the advertisement/guidance image content included in the display schedule, and
switching from the advertisement/guidance image to the service image in the first display is executed according to control by the service image scheduler that receives notification of display preparation completion of the service image from the display control apparatus and receives notification of display end time of a currently-displayed advertisement/guidance image from the advertisement/guidance image scheduler.

21. The train-mounted content delivery system according to claim 20, wherein the advertisement/guidance image content is accumulated in the display control apparatus in advance prior to the display of the advertisement/guidance image on the first display.

22. The train-mounted content delivery system according to claim 20, wherein the display schedule includes a plurality of display sequences for each of the first and second displays, and the video information delivery apparatus determines, based on the train information, a shift among the display sequences.

23. The train-mounted content delivery system according to claim 22, wherein, when the video information delivery apparatus does not determine a shift to a next display sequence, a currently-displayed display sequence is repeatedly displayed.

24. The train-mounted content delivery system according to claim 20, wherein, in the first display, when currently-displayed content is an advertisement/guidance image and content scheduled to be displayed next is a service image, switching from the advertisement/guidance image to the service image is performed after an end of the advertisement/guide image.

25. The train-mounted content delivery system according to claim 24, when the display of the advertisement/guidance image displayed on the first display is extended and the switching from the advertisement/guidance image to the service image is performed after the end of the advertisement/guidance image, an end of the display of the service image displayed on the second display according to the display of the advertisement/guidance image is adjusted to the end of the display of the advertisement/guidance image.

26. The train-mounted content delivery system according to claim 24, wherein
when at least one advertisement/guidance image content and a plurality of service image contents are included as the train content information included in the display sequence for the first display,
a service image content having a relatively low priority is incorporated as service image content displayed after display of the advertisement/guidance image content among the service image contents.

27. A method of displaying train content information applied to a train-mounted content delivery system including: a service image scheduler that manages service image content generated based on train information among kinds of train content information that should be displayed on a display in a train; an advertisement/guidance image scheduler that manages advertisement/guidance image content; a first storing unit that stores the advertisement/guidance image content; an advertisement/guidance image storing buffer that temporarily accumulates the advertisement/guidance image content, which should be displayed, prior to display of the advertisement/guidance image content; a second storing unit that stores the service image content; and a display control unit that controls, based on a display schedule set in advance, display of a service image and an advertisement/guidance image that should be displayed on the display, wherein
switching from the service image to the advertisement/guidance image in the display is executed according to control by the service image scheduler that receives notification of display preparation completion of the advertisement/guidance image from the advertisement/guidance image scheduler.

28. A method of displaying train content information applied to a train-mounted content delivery system including: a service image scheduler that manages service image content generated based on train information among kinds of train content information that should be displayed on a display in a train; an advertisement/guidance image scheduler that manages advertisement/guidance image content; a first storing unit that stores the advertisement/guidance image content; an advertisement/guidance image storing buffer that temporarily accumulates the advertisement/guidance image content, which should be displayed, prior to display of the advertisement/guidance image content; a second storing unit that stores the service image content; and a display control unit that controls, based on a display schedule set in advance, display of a service image and an advertisement/guidance image that should be displayed on the display, wherein
switching from the advertisement/guidance image to the service image in the display is executed according to control by the service image scheduler that receives notification of display preparation completion of the service image from the display control unit and receives notification of display end time of a currently-displayed advertisement/guidance image from the advertisement/guidance image scheduler.

29. A method of displaying train content information applied to a train-mounted content delivery system including: a service image scheduler that manages service image content generated based on train information among kinds of train content information that should be displayed on first and second displays in a train; an advertisement/guidance image scheduler that manages advertisement/guidance image content; a first storing unit that stores the advertisement/guidance image content; an advertisement/guidance image storing buffer that temporarily accumulates the advertisement/guidance image content, which should be displayed, prior to display of the advertisement/guidance image content; a second storing unit that stores the service image content; a first display control unit that controls, based on a display schedule set in advance, display of a service image and an advertisement/guidance image that should be displayed on the display; and a second display control unit that controls display of a service image that should be displayed on the second display, wherein
switching from the service image to the advertisement/guidance image in the first display is executed according to control by the service image scheduler that receives notification of display preparation completion of the advertisement/guidance image from the advertisement/guidance image scheduler.

30. The method of displaying train content information according to claim 29, wherein
when the train content information displayed on the first display and the train content information displayed on the second display are kinds of information related to each other,
the kinds of train content information are displayed by synchronizing timings for displaying the kinds of train content information on the first and second displays each other.

31. A method of displaying train content information applied to a train-mounted content delivery system including: a service image scheduler that manages service image content generated based on train information among kinds of train content information that should be displayed on first and second displays in a train; an advertisement/guidance image scheduler that manages advertisement/guidance image content; a first storing unit that stores the advertisement/guidance image content; an advertisement/guidance image storing buffer that temporarily accumulates the advertisement/guidance image content, which should be displayed, prior to display of the advertisement/guidance image content; a second storing unit that stores the service image content; a first display control unit that controls, based on a display schedule set in advance, display of a service image and an advertisement/guidance image that should be displayed on the display; and a second display control unit that controls display of a service image that should be displayed on the second display, wherein switching from the advertisement/guidance image to the service image in the first display is executed according to control by the service image scheduler that receives notification of display preparation completion of the service image from the second display control unit and receives notification of display end time of a currently-displayed advertisement/guidance image from the advertisement/guidance image scheduler.

32. The method of displaying train content information according to claim 31, wherein when the train content information displayed on the first display and the train content information displayed on the second display are kinds of information related to each other, the kinds of train content information are displayed by synchronizing timings for displaying the kinds of train content information on the first and second displays each other.

* * * * *